United States Patent
Bolognese et al.

(10) Patent No.: US 10,977,262 B2
(45) Date of Patent: Apr. 13, 2021

(54) DATA EXPORT JOB ENGINE

(71) Applicant: SAP SE, Walldorf (DE)

(72) Inventors: Christopher Bolognese, Vancouver (CA); Anthony Kohan, Vancouver (CA); Jonathan Tiu, Surrey (CA); Sae-Won Om, Burnaby (CA)

(73) Assignee: SAP SE, Walldorf (DE)

( * ) Notice: Subject to any disclaimer, the term of this patent is extended or adjusted under 35 U.S.C. 154(b) by 458 days.

(21) Appl. No.: 15/667,589

(22) Filed: Aug. 2, 2017

(65) Prior Publication Data
US 2019/0042631 A1    Feb. 7, 2019

(51) Int. Cl.
| G06F 16/2455 | (2019.01) |
| G06F 16/248 | (2019.01) |
| H04L 29/08 | (2006.01) |
| G06F 16/22 | (2019.01) |
| G06F 16/25 | (2019.01) |
| G06F 16/26 | (2019.01) |
| H04L 29/06 | (2006.01) |

(52) U.S. Cl.
CPC ............ *G06F 16/248* (2019.01); *G06F 16/22* (2019.01); *G06F 16/2455* (2019.01); *G06F 16/258* (2019.01); *G06F 16/26* (2019.01); *H04L 67/1097* (2013.01); *H04L 67/38* (2013.01)

(58) Field of Classification Search
CPC . G06F 16/2455; G06F 16/2471; G06F 16/248
See application file for complete search history.

(56) References Cited

U.S. PATENT DOCUMENTS

| 8,874,620 | B1* | 10/2014 | Rohr | G06F 16/252 |
| | | | | 707/803 |
| 2003/0061398 | A1* | 3/2003 | Wilson | G06F 9/465 |
| | | | | 719/318 |
| 2003/0165133 | A1* | 9/2003 | Garani | H04L 29/06 |
| | | | | 370/347 |
| 2004/0215603 | A1* | 10/2004 | Sonkin | G06F 16/24575 |
| 2005/0120016 | A1* | 6/2005 | Midgley | G06F 16/951 |
| 2006/0268913 | A1* | 11/2006 | Singh | H04L 49/90 |
| | | | | 370/412 |
| 2008/0065685 | A1* | 3/2008 | Frank | G06F 16/9537 |
| 2009/0037912 | A1* | 2/2009 | Stoitsev | G06F 9/45512 |
| | | | | 718/100 |
| 2009/0249290 | A1* | 10/2009 | Jenkins | G06Q 10/063 |
| | | | | 717/109 |

(Continued)

OTHER PUBLICATIONS

Wu et al., "Estimating Answer Sizes for XML Queries", 2002, Springer-Verlag. (Year: 2002).*

*Primary Examiner* — Sheryl L Holland
(74) *Attorney, Agent, or Firm* — Fountainhead Law Group P.C.

(57) ABSTRACT

In one embodiment, the present disclosure pertains to a data export job engine. A data export architecture may include jobs comprising a plurality of tasks configured in series. In one example embodiment, the jobs may correspond to particular data visualizations to be downloaded. In another embodiment, data visualizations in a user interface display may be created from remote data. Portions of the remote data may be downloaded to a local computer to recreate the data visualizations without the need for remote data requests.

18 Claims, 12 Drawing Sheets

(56) References Cited

U.S. PATENT DOCUMENTS

| | | | |
|---|---|---|---|
| 2011/0307522 A1* | 12/2011 | Futty | G06F 16/93 |
| | | | 707/802 |
| 2012/0330954 A1* | 12/2012 | Sivasubramanian | |
| | | | G06F 16/2228 |
| | | | 707/737 |
| 2013/0013762 A1* | 1/2013 | Mori | G06F 3/00 |
| | | | 709/223 |
| 2013/0073632 A1* | 3/2013 | Fedorov | G06Q 10/101 |
| | | | 709/205 |
| 2014/0149836 A1* | 5/2014 | Bedard | G06F 17/2247 |
| | | | 715/212 |
| 2014/0337716 A1* | 11/2014 | Priyadarshan | G06F 17/2247 |
| | | | 715/238 |
| 2014/0344817 A1* | 11/2014 | Jovanovic | G06F 9/5066 |
| | | | 718/102 |
| 2015/0154270 A1* | 6/2015 | Marinoiu | G06F 16/26 |
| | | | 707/602 |
| 2015/0169600 A1* | 6/2015 | Yu | H04L 12/6418 |
| | | | 715/234 |
| 2016/0077853 A1* | 3/2016 | Feng | G06F 9/45529 |
| | | | 719/328 |
| 2016/0203426 A1* | 7/2016 | Hankins | G06Q 10/10 |
| | | | 705/7.36 |
| 2017/0220641 A1* | 8/2017 | Chi | G06F 8/00 |
| 2018/0173754 A1* | 6/2018 | Kumar | G06F 16/248 |

* cited by examiner

DATA EXPORT JOB ENGINE

CROSS REFERENCE TO RELATED APPLICATIONS

The present application contains subject matter related to the subject matter in the following concurrently filed patent application: U.S. patent application Ser. No. 15/667,549, entitled "Downloading Visualization Data Between Computer Systems."

BACKGROUND

The present disclosure relates to computing and data processing, and in particular, to a data export job engine.

The explosive growth of data stored in computer networks has given rise to a need for improved ways to access and use the data to produce meaningful results. Data visualization helps users make use of such data by allowing a user to create a wide variety of graphs, tables, charts, or even display data geographically. However, in many modern computer systems, data processing and storage may be performed across different computers in different locations. For example, in a "cloud" environment, data may be stored remotely, and a user may access the data from a local computer where data visualizations are being displayed. In such cases, a user may not have easy access to the data underlying the data visualizations.

Downloading (or exporting) data between systems can be particularly challenging in an environment where the data is not available locally (e.g., in a "cloud" application). Local systems may often run lightweight software programs, which in some cases may be integrated into other programs. If the data sets are large, an export can quickly overwhelm a local system, resulting in undesirably long wait times, large memory spikes, or even system failure.

The present disclosure provides techniques for downloading data that may be particularly useful in data visualization applications, for example.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
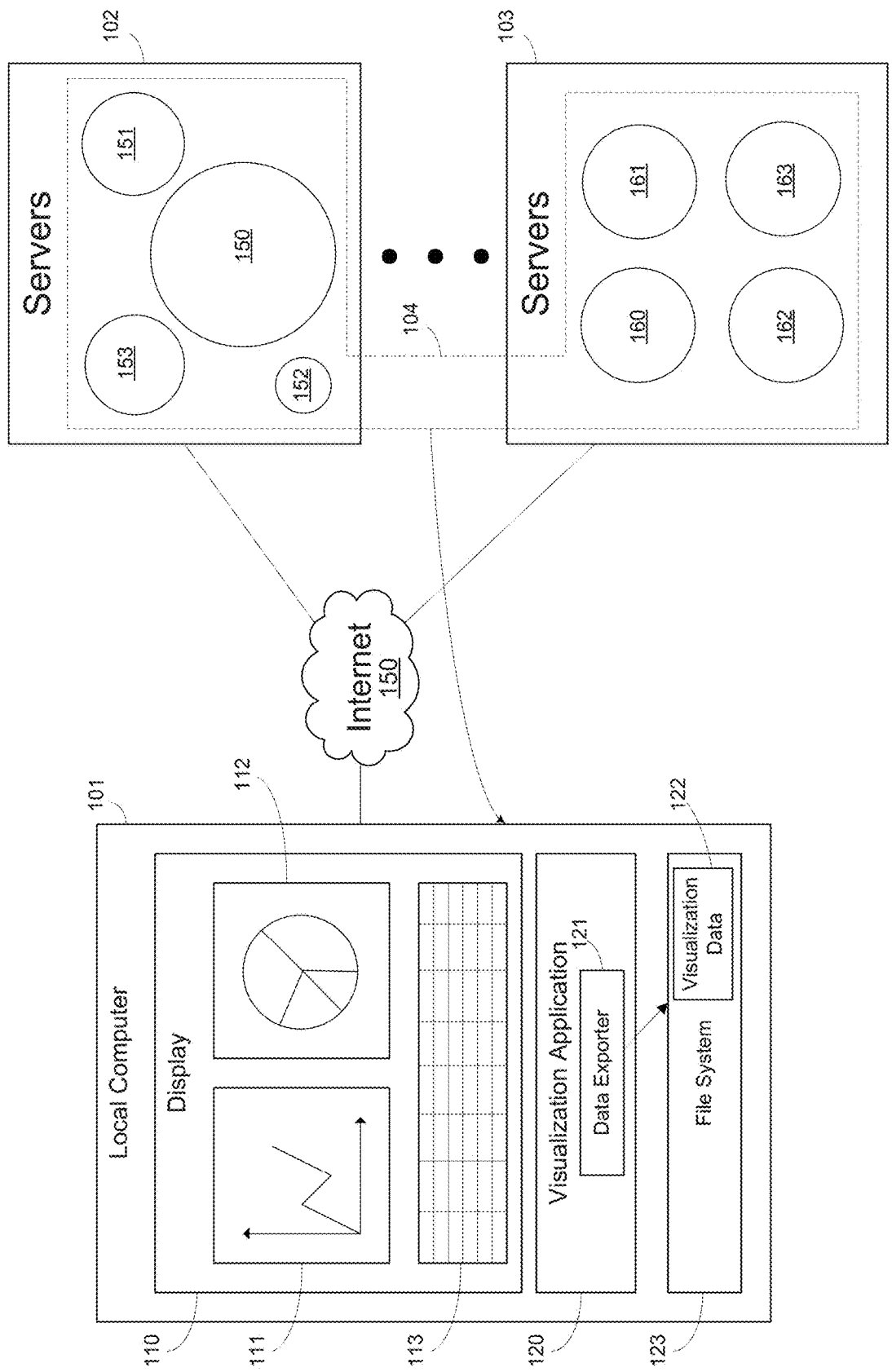
FIG. 1 illustrates downloading visualization data between computer systems according to one embodiment.

FIG. 1 illustrates downloading visualization data between computer systems according to one embodiment. In one embodiment, a local computer 101 may be configured to generate data visualizations from remote data 104. Data visualizations are visual representations of data, which include tables, charts, graphs, plots, geospatial presentations of data (i.e., a geographic data map), and the like, for example. In this example, a local computer 101 includes a display 110. Local computer 101 may execute a visualization application 120 that generates and displays data visualizations, which in this example include a graph 111, pie chart 112, and table 113, for example. The data visualizations may be derived from data stored on one or more second computer systems. In this example, data visualizations 111-113 are derived from remote data 104 stored on servers 102 and 103 and accessed across a communication network, such as the Internet 150, for example. Servers 101 may be a cloud computing network, for example, and servers 103 may be an on-prem server network, for example. "On-prem" typically refers to a network of computers (e.g., servers) on the premises (in the building) of the entity using the software, rather than at a remote facility such as a server farm or cloud. In this example, a cloud computer system 102 may store data sets 150-153 in one or more databases or similar data repository systems, and on-prem computer system 103 may store data sets 160-163 in one or more databases or similar data repository systems, for example.

In one example embodiment, visualization application 120 is implemented as application logic in a web browser, such as, for example, Chrome, Internet Explorer, Edge, Firefox, Safari, or similar browser software. A local computer 101 may execute the browser software including visualization application 120, which accesses the remote data sets 150-153 and/or 160-163, for example. In one embodiment, a user may select one or more data sets of remote data 104 and interactively create a plurality of data visualizations derived from the selected remote data sets. For example, users may select any one or more of data sets 150-153 and/or 160-163, combine them, perform calculations on specific fields, and produce any of a wide variety of results to be displayed as visualizations in display 110. Visualization application 120, running in a browser, for example, may create and store information for accessing and processing the selected remote data to produce the information in the data visualizations.

Features and advantages of the present disclosure allow users to download visualization data to a local computer. For example, one challenge with remote data storage is that it may prevent users from quickly accessing only the data they need to recreate local data visualizations quickly and at a later time without a connection to the remote servers, for example. For instance, if a user has created complex and/or potentially sensitive and secret data visualizations, the user may want to retrieve the data they need to recreate the data visualizations without accessing the remote systems. A user may want to download (or export) just the data required to recreate the visualizations (what you see is what you get "WYSIWYG" data), for example, to share such information locally in a secure manner.

In one embodiment, data visualization application 120 includes a data exporter 121. The data exporter component may receive a request to export data corresponding to a data visualization, for example. The request to export may be generated by visualization application 120 in response to a user selecting an "Export Data" button (not shown), for example. In response to the request to export, the data exporter 121 may generate a remote data request. The remote data request may include information to export the data used to create the corresponding visualization from the remote data to recreate the data visualization on computer system 101 without accessing the remote data on the servers. For example, the data needed to recreate a data visualization may be generated from the remote data and may comprise the data required to produce the same data visualization locally as was produced using the remote data itself. The remote data request from data exporter 121 may, for example, form an interface to the remote servers to obtain just the data (remotely processed, as needed) to recreate the data visualizations locally. Accordingly, visualization data 122 used to create one or more data visualizations may be received in the local computer and written to memory, such as file system 123, for example, on computer system 101 for later use and local access.

Figure 2:
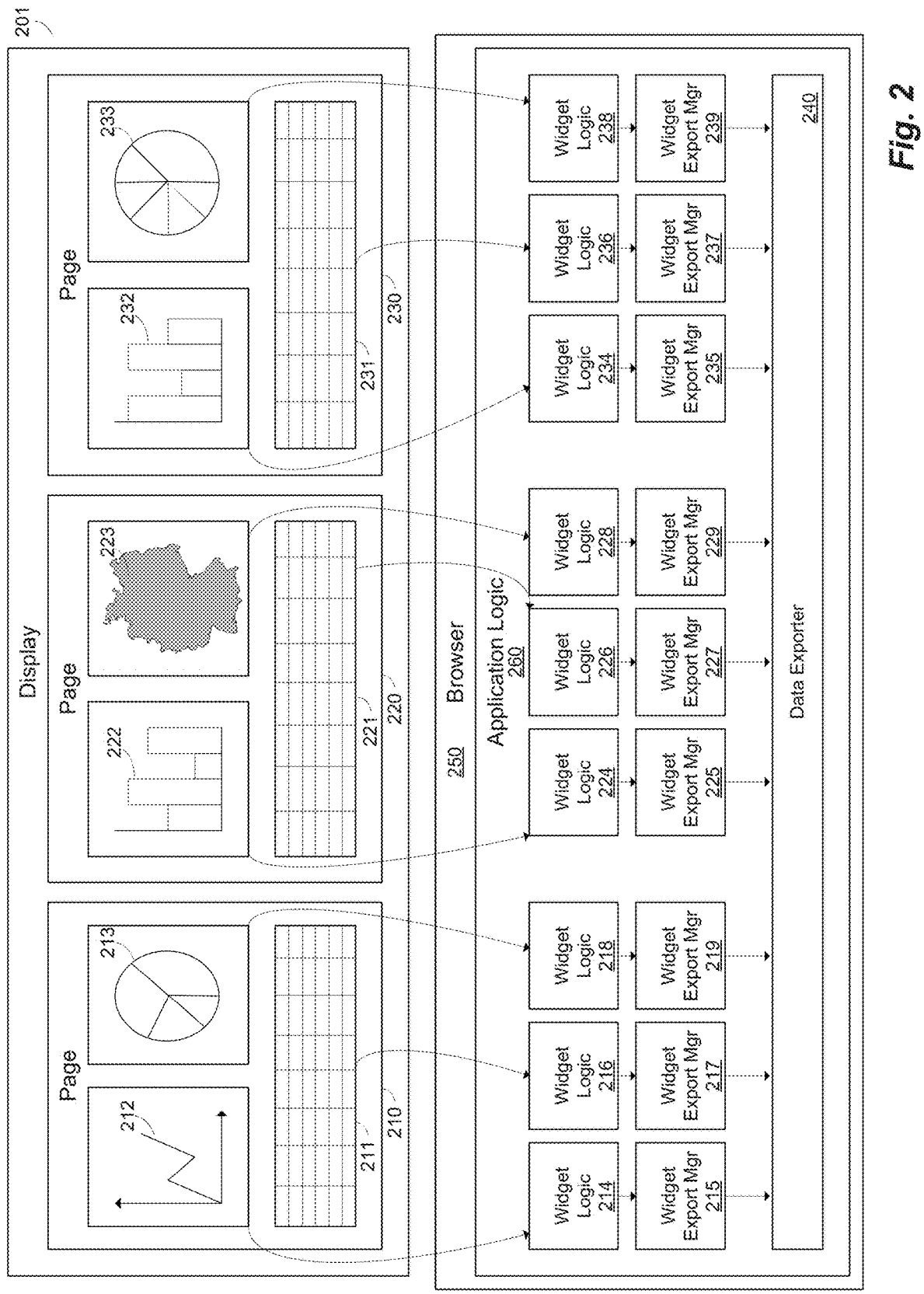
FIG. 2 illustrates an example architecture for downloading visualization data according to another embodiment.

FIG. 2 illustrates an example architecture for downloading visualization data according to another embodiment. In this example, visualization application logic 260 runs in a browser 250. A browser is a software application for retrieving, presenting and traversing information resources on the World Wide Web (e.g., a web browser), information provided by web servers in private networks, files in file systems, or the like, for example. In this example, application logic 260 supports creation of data visualizations in a plurality of different pages 210, 220, 230. In this case, page 210 includes data visualizations 211-213, page 220 includes data visualizations 221-223, and page 230 includes data visualizations 231-232. The pages, taken together, may produce what is sometimes referred to as a "story." Some of the data visualizations may access different remote data sets and perform different operations on the remote data to produce different visualization results and other data visualizations may access the same remote data sets, for example. In one embodiment, a user may access and display a subset of pages (e.g., 1 page) of data visualizations at a time. To save local memory and processing (e.g., in a browser), some embodiments, for example, may eliminate data visualizations that are on pages that are not currently being displayed. Accordingly, in this example embodiment, when a new page is selected, the data visualizations for the new page may need to be recreated. Thus, if a user selects a number of data visualizations for data export and then changes pages, it may be challenging to perform the export process because the underlying data visualization information and interfaces to the data may be lost when the data visualizations are eliminated upon leaving the page, for example.

Features and advantages of the present disclosure include a method and architecture for capturing information to export data for a particular data visualization, which, for example, may advantageously survive even if a particular data visualization is eliminated (e.g., when a page is changed). In one embodiment, each data visualization is generated by corresponding widget logic. For example, data visualization 212 (a graph) is generated by corresponding widget logic 214, data visualization 211 (a table) is generated by corresponding widget logic 216, and data visualization 213 (a pie chart) is generated by corresponding widget logic 218. Widget logic may comprise computer code to implement the logic for obtaining data corresponding to a particular data visualization from remote servers, for example. For instance, as a user builds a data visualization, the user may select data sets, perform operations and calculations on particular fields, and generate results to be visualized. Widget logic may include code to implement the interface to the servers and databases to implement data manipulations specified by the user (e.g., some of which may be on the backend). In one embodiment, widget logic for each data visualization may comprise a query manager, which may be implemented as an object having a corresponding class for establishing an interface for communicating with remote data sources, accessing remote data, and performing operations specified by a user, for example. In one embodiment, different data visualizations types may have different widget logic objects and classes. For example, a table may have one type of widget logic with corresponding objects and classes optimized for table visualizations, a chart may have another type of widget logic with corresponding objects and classes optimized for chart visualizations, a geospatial data visualization may have yet another type of widget logic with corresponding objects and classes optimized for presenting geospatial data visualizations, and so on for other data visualization types, for example.

In one embodiment, each widget logic advantageously has a corresponding widget export manager. In this example, for page 210, widget logic 214 has corresponding widget export manager 215, widget logic 216 has corresponding widget export manager 217, and widget logic 218 has corresponding widget export manager 219. In some embodiments, the widget export manager handles the export process for a particular widget and a corresponding data visualization. In particular, widget export managers may send information to access the data for a data visualization from the widget logic to data exporter 240. In one example embodiment, the widget export managers may copy the state of the query manager in the widget logic (e.g., as a query model) for use in the data exporter 240—e.g., in a job as described in more detail below. The widget export manager may then send a query model, a data set identification, and one or more data filters for the particular widget to data exporter 240. In some embodiments, filters may be applied on either a widget level, a "story" level (across one or more pages, or both, for example. For instance, a user may access remote data and apply one or more filters for use across all data visualizations on all pages to create the story. Thus, in some embodiments, one or more of the data filters are associated with a plurality of data visualizations. Such filters may be accessed and sent to the data exporter 240 to gather data to recreate particular data visualizations, for example. Data exporter 240 contains logic for managing export requests from multiple data visualizations, accessing remote data sources using the information from the widget logic, and saving the data needed to recreate each data visualization in a local file store, for example.

As illustrated in FIG. 2, the above described process may be applied across multiple data visualizations on multiple pages. Additionally, in one example implementation, different types of data visualizations may have different corresponding widget logic and export managers optimized for the particular data visualization. In this example, on page 220, a chart visualization 222 may have a corresponding chart widget logic 224 and chart widget export manager 225, a geospatial data visualization 223 has a corresponding geospatial widget logic 228 and geospatial widget export manager 229, and a table visualization 221 has a corresponding table widget logic 226 and table widget export manager 227.

Figure 3:
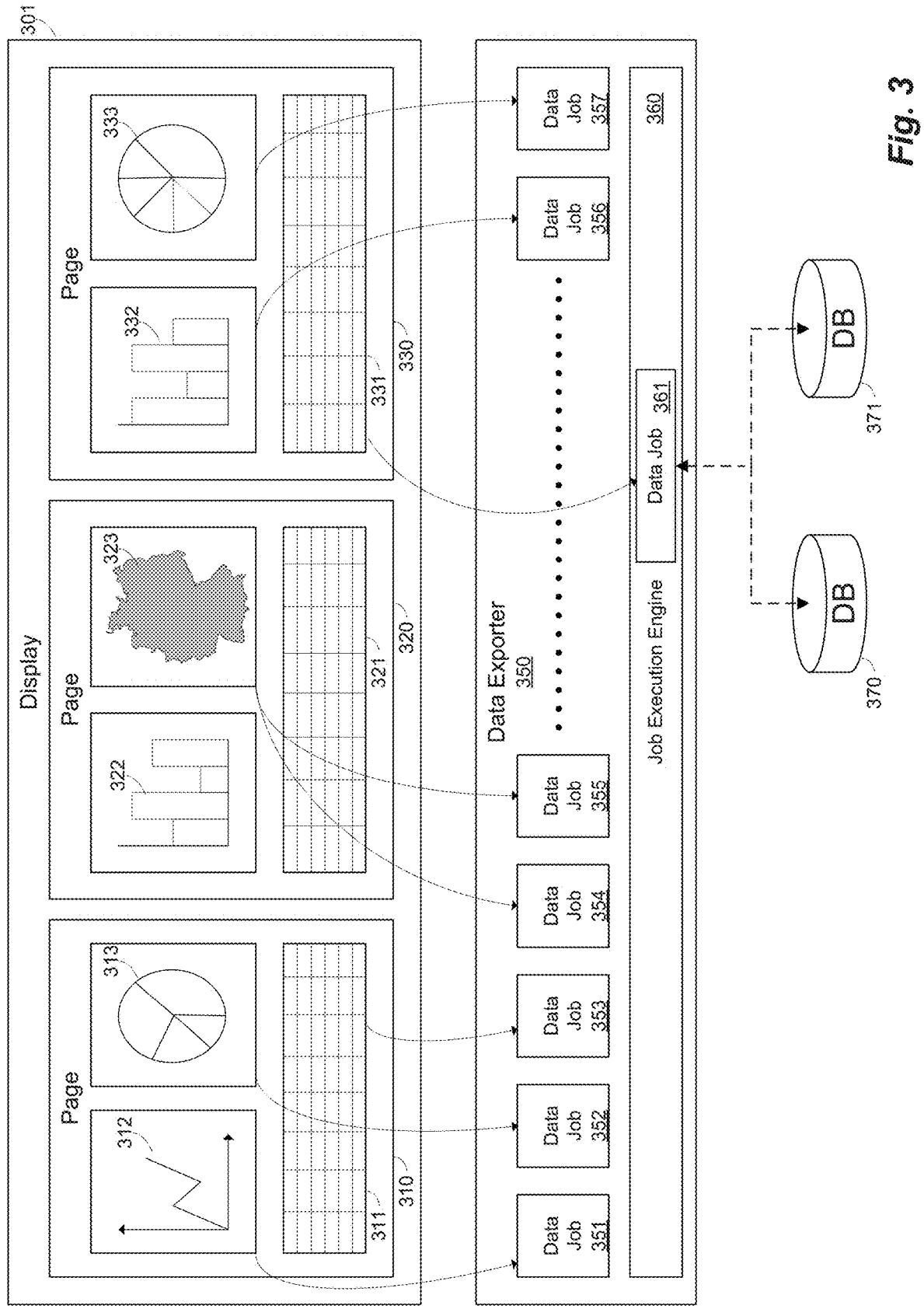
FIG. 3 illustrates an example architecture for a data exporter according to another embodiment.

FIG. 3 illustrates an example architecture for a data exporter according to another embodiment. In this example, data visualizations are exported by corresponding jobs ("data jobs") in data exporter 350. For example, a user may select page 310, which causes data visualizations 311-313 to be shown in display 301. If a user triggers a request to export for data visualization 312, for example, a corresponding job 351 is created in data exporter 350. Similarly, exporting data visualization 313 may produce job 352, exporting data visualization 311 may produce job 353, exporting data visualization 332 on page 330 may produce job 356, and exporting data visualization 333 on page 330 may produce job 357. As illustrated in page 320, a single data visualization may produce multiple jobs. For example, if a user wants to export multiple versions of the data underlying the visualization, the user may trigger two exports (e.g., by clicking an "Export" button twice). In this example, a geospatial visualization 3232 has been exported twice, resulting in two jobs 354 and 355 in data exporter 350.

In this example, once a job is created, the data exporter 350 may either designate that job as "in progress" ("running") or "in queue" based on available resources. Data exporter 350 includes a job execution engine 360, which executes each job. Job execution engine 360 may obtain information for each job, which may include accessing information about data sources used by a particular data visualization, filters, and a query model, for example. For example, in one embodiment a job may receive a data set identification, a query model, filters, a widget identification uniquely specifying corresponding widget logic, and potentially other information for a corresponding data visualization from the widget export manager.

When a job is executed, a connection is established to the data sources storing the data for the data visualization, and one or more queries are initiated against the data sources to retrieve data needed to reproduce the data visualization. In this example, a data job 361 corresponding to table visualization 331 is executed by job execution engine 360 and connections are established to databases 370 and 371, for example. Data job 361 may include information for initiating a query to databases 370 and 371 to retrieve and manipulate data to reproduce table 331 at a later time without accessing the databases 370 and 371, for example.

Figure 4:
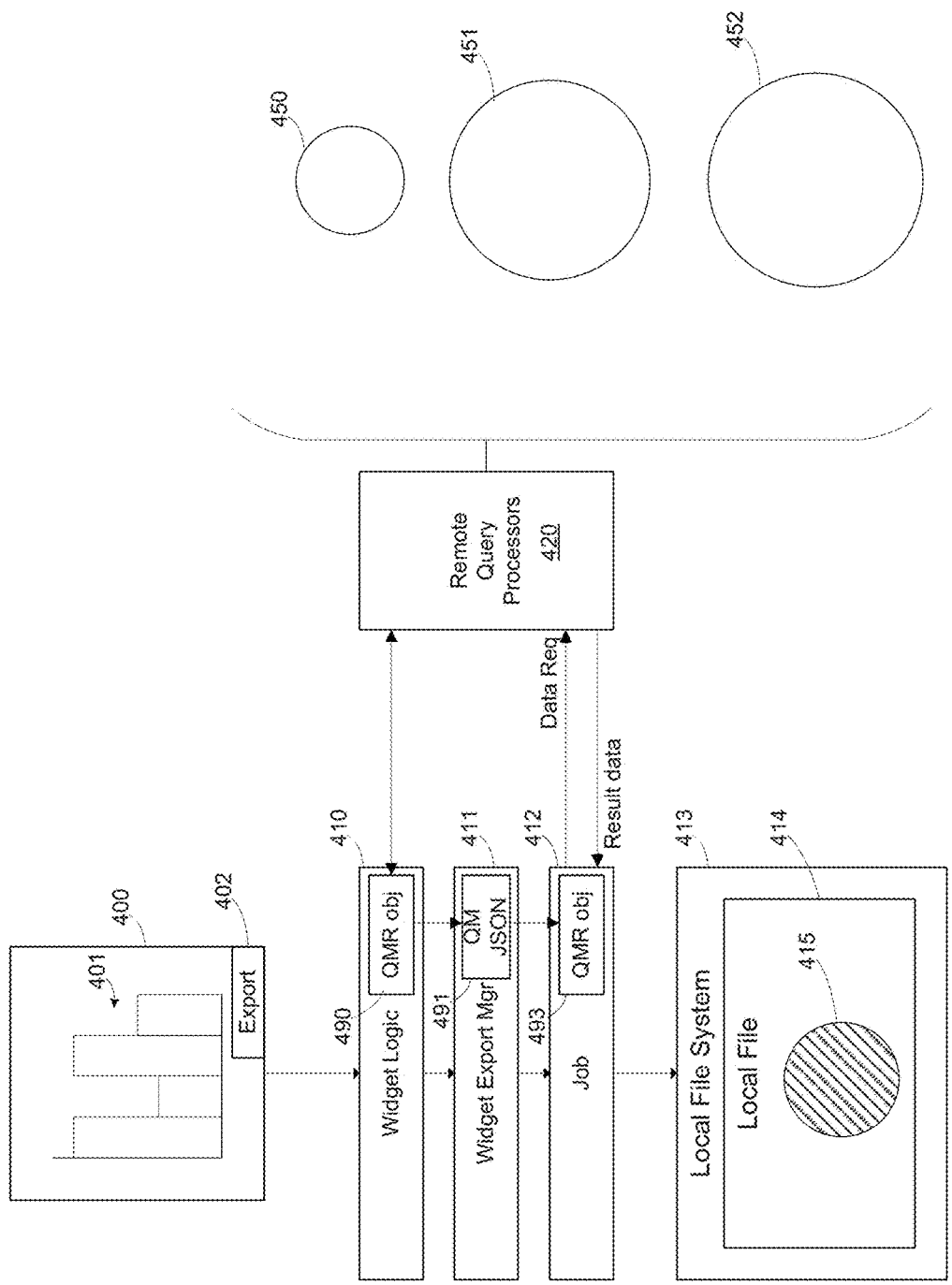
FIG. 4 illustrates another example of downloading visualization data according to another embodiment.

FIG. 4 illustrates another example of downloading visualization data according to another embodiment. In this example, each data visualization is generated and controlled by corresponding widget logic, and each widget logic has a corresponding widget export manager. Here, a bar chart data visualization 400 includes bar chart data 401 and an export button 402 presented in a display. Widget logic 410 may generate interfaces to backend systems, for example, and may include computer code for allowing a user to select one or more remote data sets 450-452, manipulate the data sets, and produce the data visualization, for example. While data visualizations are illustrated here, it is to be understood that the data export techniques described here are applicable to other applications. In this example, widget logic 410 may include a query manager, which in this example is a query manager object ("QMR obj") 490. QMR obj 490 may include information about particular remote data sets selected and accessed by a user (e.g., identification information, connection information, identification of particular tables in the data sets, etc . . . ), queries against such data sets, dimensions, calculations, and filters applied, for example. When a user is manipulating and/or building a data visualization (e.g., in a browser), widget logic 410 may use QMR obj 490 to manage accessing and processing the remote data for local use in data visualization 400. For example, widget logic 410 may use QMR obj 490 to initiate one or more backend queries on one or more remote query processors 420, which may be cloud or on-prem (or both) instances of database management systems, for example, such as one or more HANA® instances from SAP®. Remote query processors 420 may perform queries against one or more remote data sets 450-452 to produce data visualization 400.

Features and advantages of the present disclosure may include a widget export manager 411 that copies QMR obj 490 from corresponding widget logic 410 for use in the export process. For example, once a user selects the Export button 402, widget export manager 411 may generate a query model Javascript Object Notation (JSON) object 491 ("QM JSON") representing QMR obj 490 at the time the export was requested. QM JSON may capture the state of QMR obj 490 at the time the request to export data is received, for example. Reproducing, copying, or otherwise converting the QM obj 490 to QM JSON object 491 may advantageously allow the system to perform an export on a data visualization, for example, at a later point in time even after the data visualization may have changed or been eliminated altogether (e.g., if the user changes to another page or logs out). An example of a simple QM JSON is illustrated in Appendix A attached hereto.

In this example, in response to receiving the request to export, a data exporter component creates a single job 412 corresponding to a particular data visualization to be exported. Job 412 may receive QM JSON 491 and recreate the QMR obj 490 in the same state it was at the time the export was initiated, for example. Here, job 412 generates QMR obj 493 to establish an interface with remote query processors 420. Additionally, job 412 may receive a data set identification and filters for a corresponding data visualization from the widget export manager 411. Accordingly, job 412 has sufficient information to generate a remote data request to the remote query processors 420 and retrieve data to recreate data visualization 400 on the local computer. Result data 415 may be stored as a local file 414 on a local file system 413, for example, and used at a later time to generate data visualization 400 without having to access remote data. In some example embodiments, different data visualizations may have different widget logic types and different corresponding query manager and QM JSON types to optimize the processing of particular charts (e.g., a plot vs. a table vs. a geomap).

Figure 5:
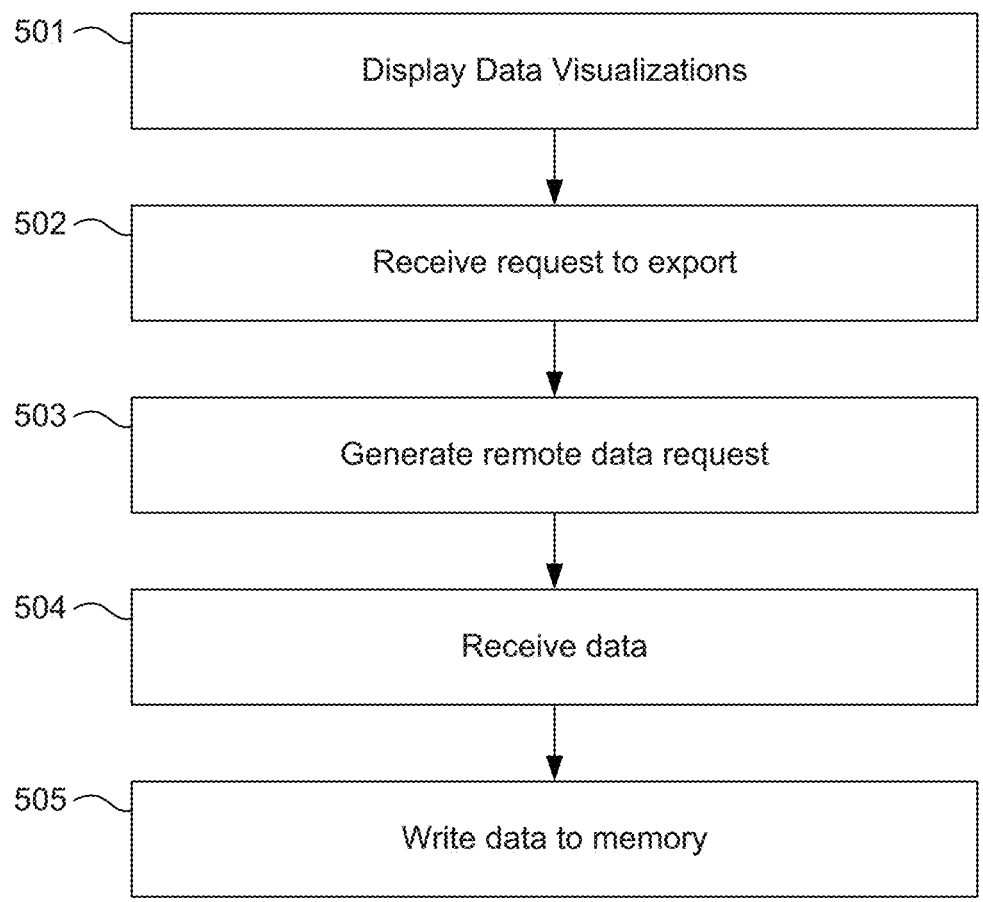
FIG. 5 illustrates a method of downloading visualization data according to an embodiment.

FIG. 5 illustrates a method of downloading visualization data according to an embodiment. At 501, a first computer system may display one or more data visualizations derived from second data stored on one or more second computer systems. At 502, the first computer system may receive a request to export first data corresponding to at least one of the data visualization. At 503, the first computer system may generate a remote data request. The remote data request may include information to produce the first data from the second data, for example, where the first data is produced based on the second data stored on the one or more second computer systems. The first data comprises data to recreate the at least one data visualization on the first computer system without accessing the second data on the one or more second computer systems, for example. At 504, the first data is received in the local computer, and at 505 the first data is written to a memory on the first computer system.

Figure 6:
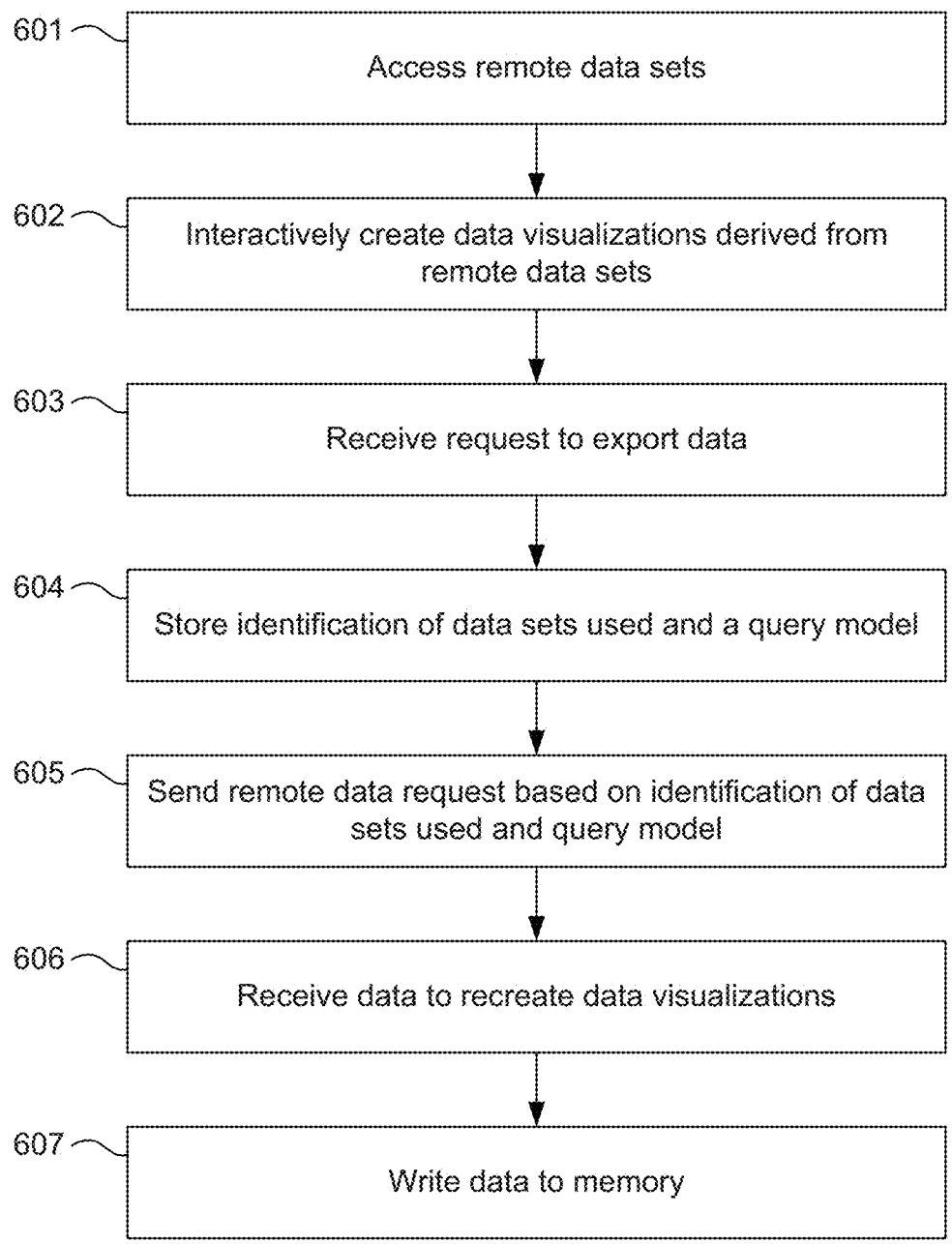
FIG. 6 illustrates a method of downloading visualization data according to another embodiment.

FIG. 6 illustrates a method of downloading visualization data according to another embodiment. In this example, one or more remote data sets are accessed by a browser at 601. At 602, a user may interactively, in the browser, create a plurality of data visualizations derived from the one or more remote data sets. At 603, a request to export the data used to produce the corresponding data visualization is received in the browser. At 604, an identification of the one or more remote data sets and a query model are stored in local memory for each data visualization. The identification specifies the one or more remote data sets used to produce a corresponding data visualization, and the query model represents a remote query on the remote data sets to retrieve data used for the corresponding data visualization, for example. At 605, a remote data request is sent, by the browser, to one or more second computer systems that store the remote data sets. The remote data request is generated based on the identification of the one or more remote data sets and the query model. At 606, first data is received in the browser. The first data may be data sufficient to recreate the data visualizations without accessing the remote data sets, for example. At 607, the first data may be written to a memory on a local computer system via the browser.

Figure 7:
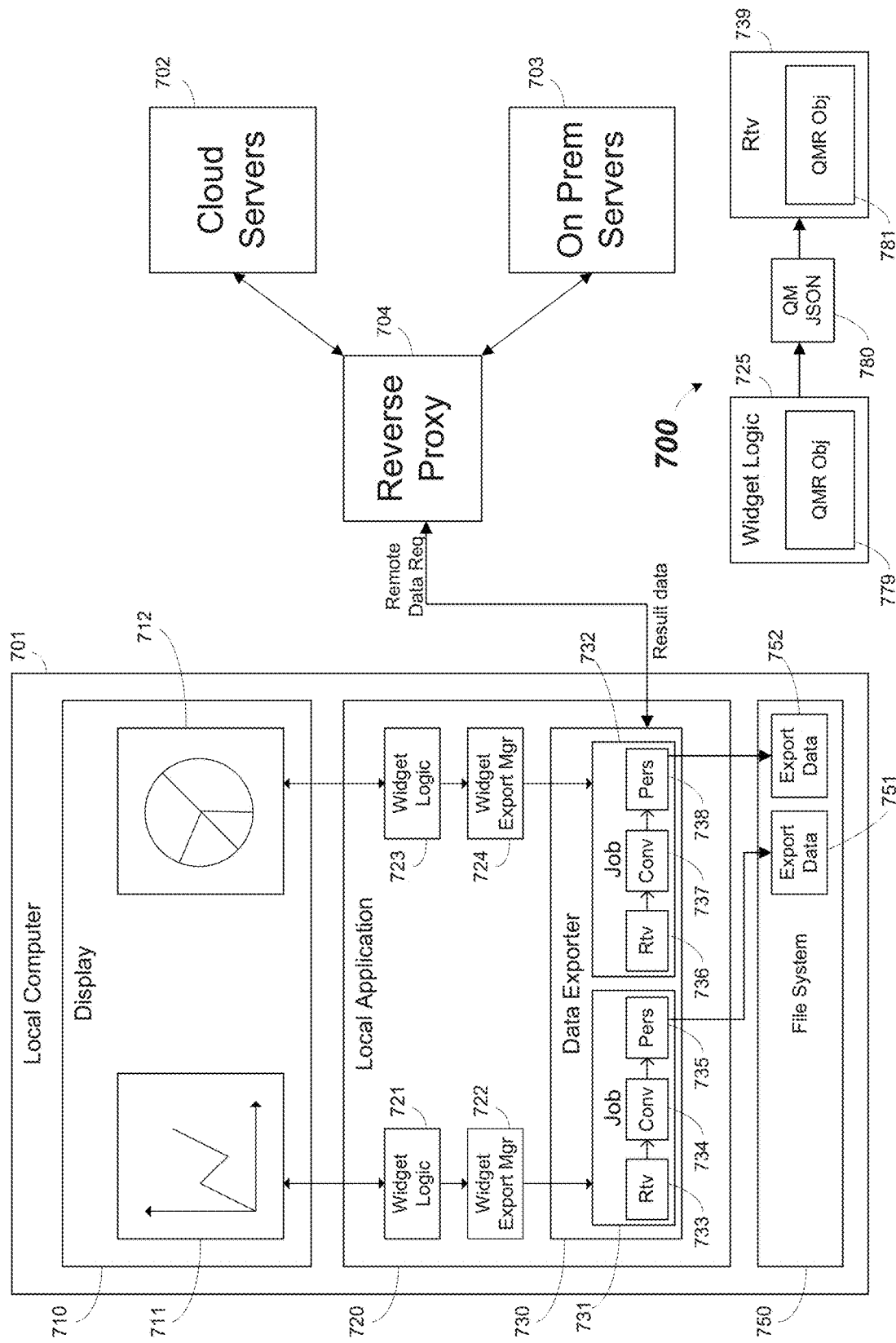
FIG. 7 illustrates an example architecture for exporting data according to another embodiment.

FIG. 7 illustrates an example architecture for exporting data according to another embodiment. Features and advantages of the present disclosure may also include a data exporter architecture comprising jobs with independently operable tasks configured in series to improve the data export process on a client computer system operating in a browser, for example. In this example, a local computer 701 may include a local application 720, which may be running in a browser, for example. As mentioned above, one embodiment of the local application 720 may be a data visualization application, but the data export techniques described herein may be applicable to other types of applications.

As shown in FIG. 7, local computer 701 includes a display 710. Local application 720 may generate and present data in the form of plots 711, charts 712, tables, or other graphical user interface techniques, for example. As mentioned above, in some embodiments each user interface element (e.g., a data visualization) may be generated by corresponding widget logic. In this example, plot 711 is generated by widget logic 721 and chart 712 is generated by widget logic 723. Each widget logic component may include code to allow a user to access data stored on backend systems, such as cloud servers 702 or on prem servers 703, for example. In some example embodiments, such communications may be made using a reverse proxy server 704. Accordingly, potentially vast amounts of remotely stored data on backend computer systems may be accessed, manipulated, and presented in the local application, such as a browser application, to present the user with a wide range of data results locally.

In some circumstances, it may be desirable for a user to save local data results on the local computer 701. A user may initiate a request to export by selecting an "Export Data" button (not shown in FIG. 7) or similar menu item, for example, which causes the local application 720 to receive an request to export. In one embodiment, a data export job may be generated for each request to export data. In this example, widget logic 721 may include a widget export manager 722, which initiates creation of a data export job 731 in data exporter 730. Similarly, widget logic 723 may include a widget export manager 724, which initiates creation of a data export job 732 in data exporter 730.

Features and advantages of the present disclosure include job architectures comprising a series of export tasks configured in series, with each task operating independently of the other tasks, for example, where tasks may consume inputs and pass outputs to the next task in the series. FIG. 7 illustrates two example jobs 731 and 732 resulting from requests to export received in widget logic 721 and widget logic 723, respectively. Data export job 731 includes a data retrieval task ("Rtv") 733, a data conversion task ("Cony") 734, and a data persistence task ("Pers") 735 configured in series. Similarly, data export job 732 includes a data retrieval task ("Rtv") 736, a data conversion task ("Cony") 737, and a data persistence task ("Pers") 738 configured in series. A data retrieval task, Rtv, may receive information to access remote data, such as, for example, a data set identification, a query model, and data filters to initiate remote queries. Accordingly, an Rtv may establish an interface to one or more data storage systems on servers 702 and 703, for example, and return the desired data as a result set. In one example embodiment, a data retrieval task may include a query export task and a data parser task. The query export task may communicate with the remote systems using a hypertext transfer protocol (HTTP) and data is received in pages, and the data parser task parses the data results (e.g., the pages of data) and produces arrays of data, for example. In another embodiment, the data retrieval task is a data streaming task that communicates with the remote systems using a transmission control protocol (TCP) to produce arrays of formatted data as a stream of packets from backend servers, for example. Arrays of data may be converted between formats in the data conversion task, for example. Finally, a data persistence task converts the data to binary and stores the data in local memory. For example, as illustrated in FIG. 7, Pers 735 and Pers 738 store exported binary data 751 and 752, respectively, in the memory of a local file system 750.

In one embodiment, a data retrieval task may receive a query model that represents a remote query on remote data to retrieve data to be exported and generates a remote data request specifying queries on the backend computer systems. One example approach to communicating with backend systems is shown at 700 in FIG. 7, which shows an example widget logic 725 and data retrieval task 739. In this example, widget logic 725 establishes an interface with backend data storage systems using a query manager object ("QMR obj") 779 to provide a user with real time access to remote data via the user interface. When a request to export is received (e.g., in a UI), the state of the QMR obj 779 is saved in a query model JSON object 780. When the particular export job is executed, the QM JSON 780 is used to instantiate a new QMR obj 781 by data retrieval task ("Rtv") 739, for example. Accordingly, Rtv 739 may access the data in the same state as it was accessed when the request to export was received in the widget logic 725.

Figure 8:
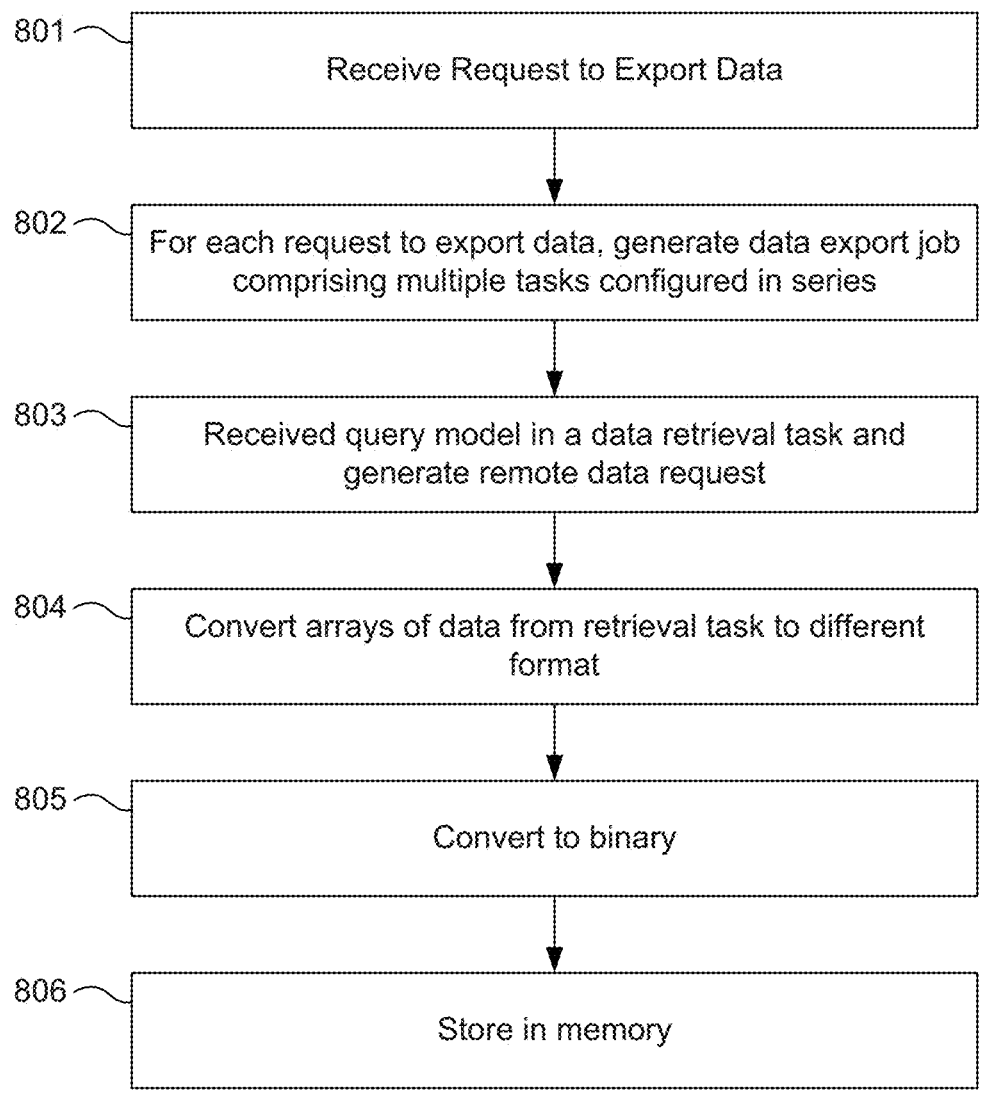
FIG. 8 illustrates a method according to another embodiment.

FIG. 8 illustrates a method according to another embodiment. In this example, a request to export data is received on a first computer system at 801. The data to be exported may be stored remotely on one or more second computer systems (e.g., servers) and used by a local software application on the first computer system, for example. At 802, a data export job is generating for each request to export data. Each data export job includes a plurality of independently operable tasks comprising a data retrieval task, a data conversion task, and a data persistence task configured in series, for example. At 803, the data retrieval task receives a query model that represents a remote query on remote data to retrieve the data to be exported. Using the query model, the data retrieval task may reproduce the local data by generating a remote data request specifying queries on the second computer systems, for example. At 804, the data conversion task converts arrays of formatted data received from the data retrieval task in a first format to exported data in a second format. At 805, the data persistence task converts the exported data in the second format to a binary format, and at 806 the exported data is stored in binary format in memory on the first computer system.

Another aspect of the disclosure includes dynamically setting a page size for a data transfer. For example, in one embodiment, remote data is retrieved from remote systems in pages, where the remote queries are configured to produce approximately the same size pages that are below a threshold page size, for example. In one embodiment, the local system may initiate a first query configured to return one row (or some small number of rows) for the purpose of determining the number of cells in each row. By analyzing the structure of a particular row, the system may set the approximate page size for subsequent queries from the number of cells per row, for example, where # totalcells/page=# rows×# cells/row. Subsequent queries may retrieve approximately constant page sizes by specifying the number of rows to retrieve in each page of the result set as follows: # rows=(# totalcells/page)/(#cells/row), where # totalcells/page<threshold. Thus, subsequent queries may specify a number of rows of data to return from the remote data to produce approximately the same page size, for example, based on the number of cells per row.

Figure 9:
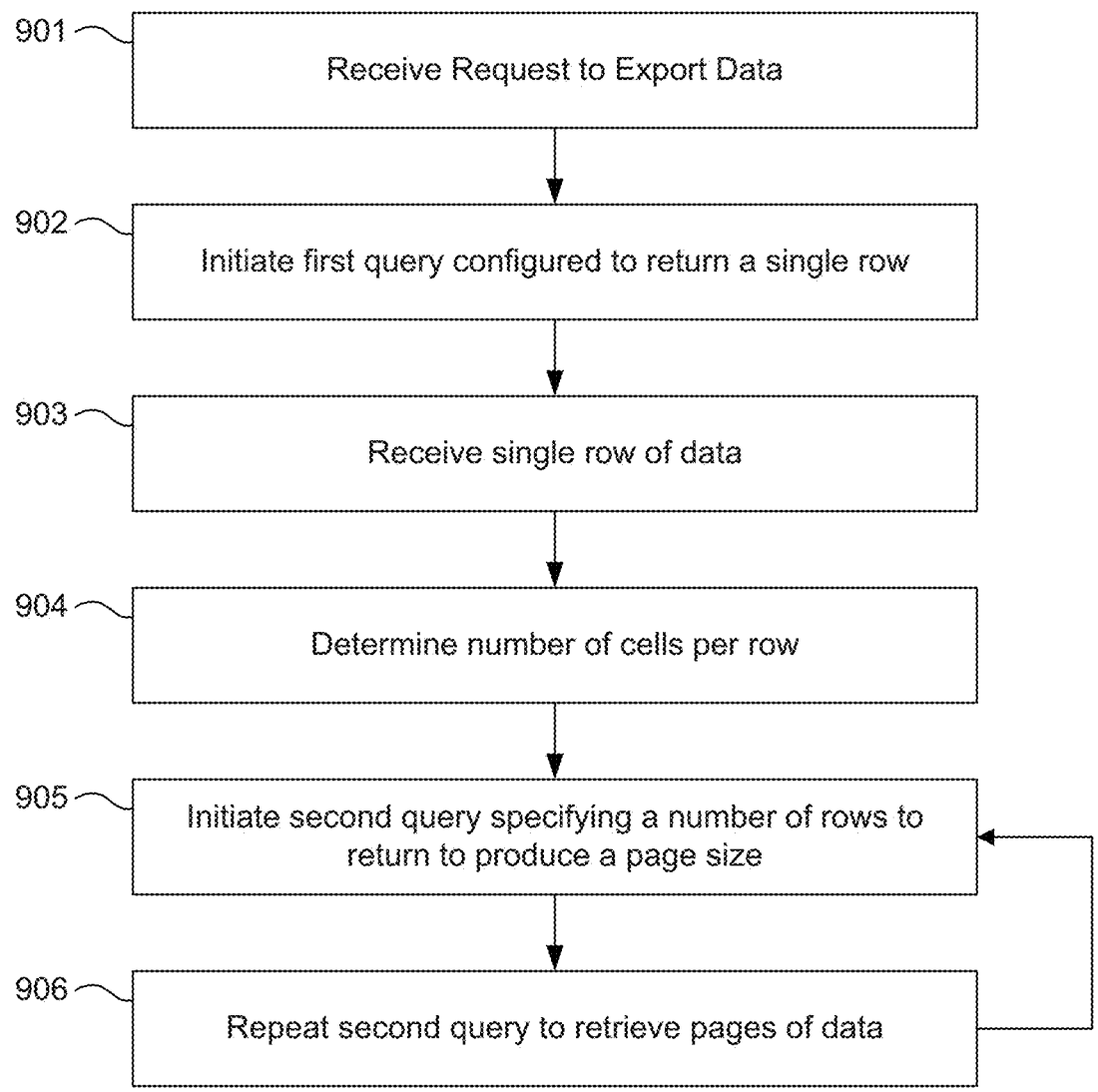
FIG. 9 illustrates a dynamic paging method according to another embodiment.

FIG. 9 illustrates a dynamic paging method according to another embodiment. At 901, a request to export data associated with an application running on a browser operating on a local computer system is received. The application may access remote data stored on one or more second computer systems such as a cloud or on prem server, for example. At 902, a first query is initiated. For example, in some embodiments a query manager object may send instructions to a data source specifying a query for the data source to perform using a native query format for that data source. The first query is configured to retrieve at least a single row of data from one or more remote data sets on the second computer systems. Data may be stored in a wide variety of structures, and may include hierarchies, for example. The first query may be configured to return only a single row so that the structure of the data may be determined by the application running on the browser, for example. Likewise, other small numbers of rows could also be specified, but in one embodiment only a single row is sufficient. At 903, the at least one single row of data is received on the local computer system. At 904, a number of cells per row of data is determined, for example, in by examining a single row. At 905, a second query is initiated. The second query specifies a number of rows of data to return from the remote data on the second computer system to produce a page size based on the number of cells per row. For example, if the first query indicates that a data set has 5 cells per row (e.g., 5 columns of a table), then the second query may specify, for example, 370 k rows and consistently return a page size of 1.85M cells. Accordingly, at 906, the second query may be repeated to retrieve a plurality of pages of data each below a threshold page size. In some example embodiments, the dynamic paging technique described here in connection with FIG. 9 may be used in combination with one or more of the other techniques described in this disclosure to improve the efficiency of executing data export jobs, for example. In particular, dynamic paging may be included in a query export task (described above) to retrieve data and pass the data as an input to a data parser task, for example.

Advantages of dynamic paging may include improving the movement of data between computers, for example, between remote servers and a local system running a browser application, because the receiving system may have stringent memory limitations. This may be particularly advantageous where the local computer software is unable to determine, in advance, what the size of the data sets being retrieved may be. Features and advantages of dynamic paging/page size may include safely maximizing the data transfer throughput which may lead to minimizing the overall time of the data export. For example, the number of columns of data per row may be drastically different for different data sets. Thus, a data retrieval request may unknowingly result in the movement of large amounts of data to an application running in a browser, which may slow down or even crash the system. The memory management advantages of the above techniques may be compounded when local applications access multiple different data sets with different schemas (e.g., columns and hierarchical levels) across multiple different data repositories, for example.

Figure 10:
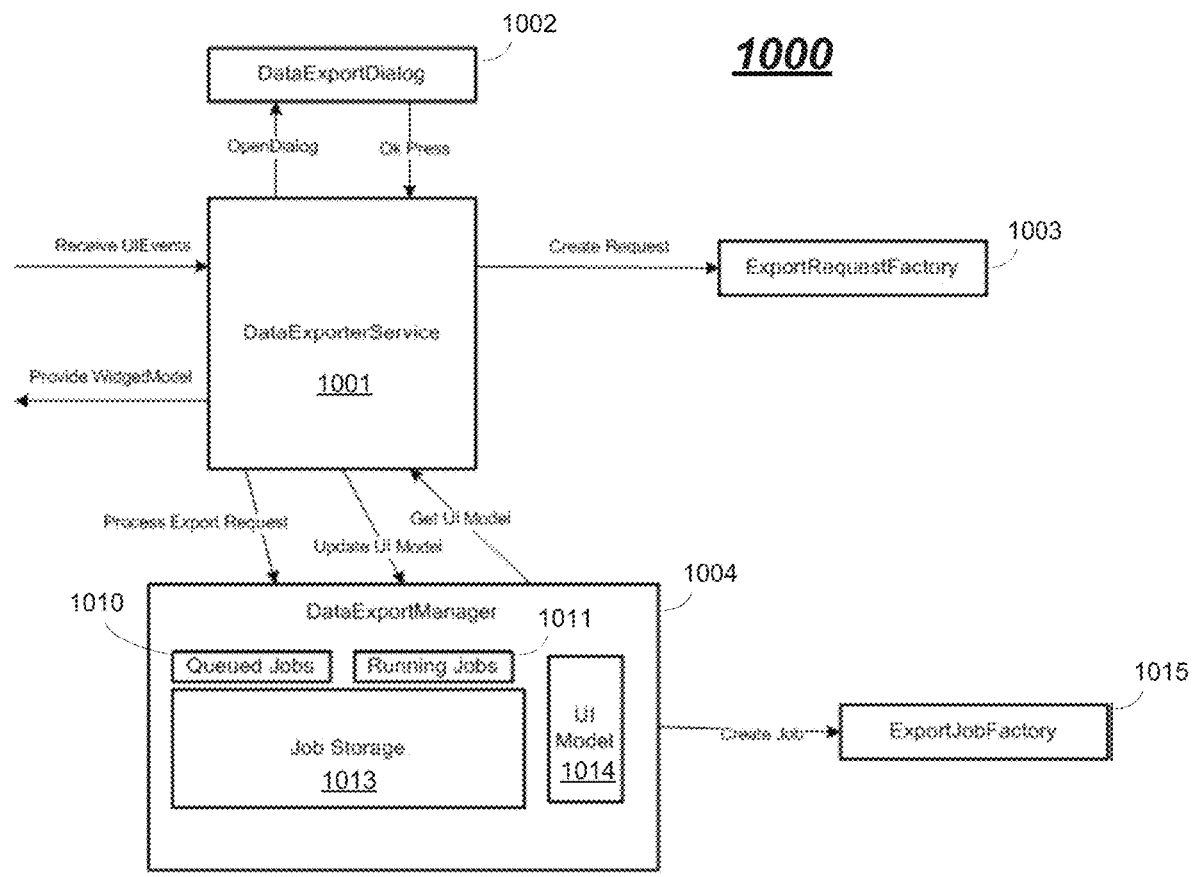
FIG. 10 is an example implementation of a data exporter according to an embodiment.

FIG. 10 is an example implementation of a data exporter according to an embodiment. In one embodiment, the data exporter of FIG. 10 and job architecture in FIG. 11 (below) may be implemented in Javascript in a browser, for example, running on a local client computer. In this example, a data exporter 1000 includes a Data Exporter Service 1001, Data Export Dialog 1002, Export Request Factory 1003, Data Export Manager 1004, Export Job Factory 1015. Data Exporter Service ("DES") 1001 may be the interface between the widget export managers, for example, and the mechanisms within data exporter 1000. DES 1001 may receive user interface ("UI") events containing, for example, an object with a data model including information used by the data exporter 1000. DES 1001 may verify that all the needed information is included, for example: a query model, a specification of the data set(s) to be retrieved, and other information to perform the export. DES 1001 may send an OpenDialog signal to the Data Export Dialog ("DED") 1002, which prompts the user for file names and any settings pertinent to data exporting, for example. DES 1001 then sends a CreateRequest to the Export Request Factory 1003, which generates job requests (or export job requests) with unique ID, for example. Once a job request is generated, DES 1001 makes a call to Process Export Request, for example, to process the job request. The following parameters may be included in each job request, for example: Widget ID: the id of the widget that initiated the export request (this parameter is used to maintain information about which widgets have exports already in progress or queued); Query: a serialized query that will be used if the query manager isn't specified; Query Manager: the pre-configured query manager that will be used to make remote data requests; Data Source: the data source the widget will be exporting data from; Calculation Metadata: metadata about any calculations being used by the widget; Widget Context: context used by the originating widget (this can be used to get any external services that may be needed for exporting—e.g. filters and variables); Minimum Drill State Map: mapping of required dimensions to satisfy minimum drill state; Required Dimensions: required dimensions to satisfy minimum drill state; Display Information Map: mapping of information to be used when displaying a value in CSV cell; and Scale Units: unit to be used when formatting is enabled.

Data Export Manager ("DEM") 1004 includes a job storage data structure 1013 and user interface ("UP") model 1014 and manages job creation, queued jobs 1010, and running jobs 1011. UI model 1014 is used to determine if a particular widget (e.g., a data visualization) can or cannot be exported. In one embodiment, widgets do not contain the logic to determine if they are in a state where they can or cannot perform a data export. Accordingly, UI model 1014 may store information relating to whether data for a widget is valid (e.g., free of error messages or a problem with the query model), whether a valid data source has been specified, or whether there is space in the job queue, for example. The UI model 1014 may store such information for each and every active widget/visualization, for example, and periodically update the UI model with a call to Update UI Model. For example, DEM 1004 regularly receives status updates from each available widget manager, notifying the service whether the widget is able to export. This information is used to update the UI model to show whether the widget can be exported or the reason it is unable to export (E.g. no data, the widget is already exporting, or an error has occurred).

When a job request is received by the DEM 1004, and if the UI model indicates an export is allowed, DEM 1004 may call Create Job in Export Job Factory ("EJF") 1015. For example, when a job request is received, DEM 1004 may create the appropriate export job type and start the job, or places the job in the queue to be started once resources are available. EJF 1015 may instantiate a job as described in more detail below and register the job in job storage 1013 (e.g., using a widget ID and job ID pair). For example, export jobs may be placed in a map using two keys: the widget's ID and the requests unique ID (e.g., a job ID). Two keys may be used in order to allow a widget to support multiple export requests at once and to allow configuration on the number of jobs that can be in use per widget. These keys are also stored in one of two arrays to keep track of jobs queued and in progress (running). In one embodiment, queued jobs 1010 comprises a list of widget ID/job ID pairs that are in queue, and running jobs 1011 comprises a list of widget ID/job ID pairs that are running, for example. Advantageously, the above queued job and running job managers allow multiple exports from the same or different widgets to be performed at nearly the same time, for example.

Figure 11:
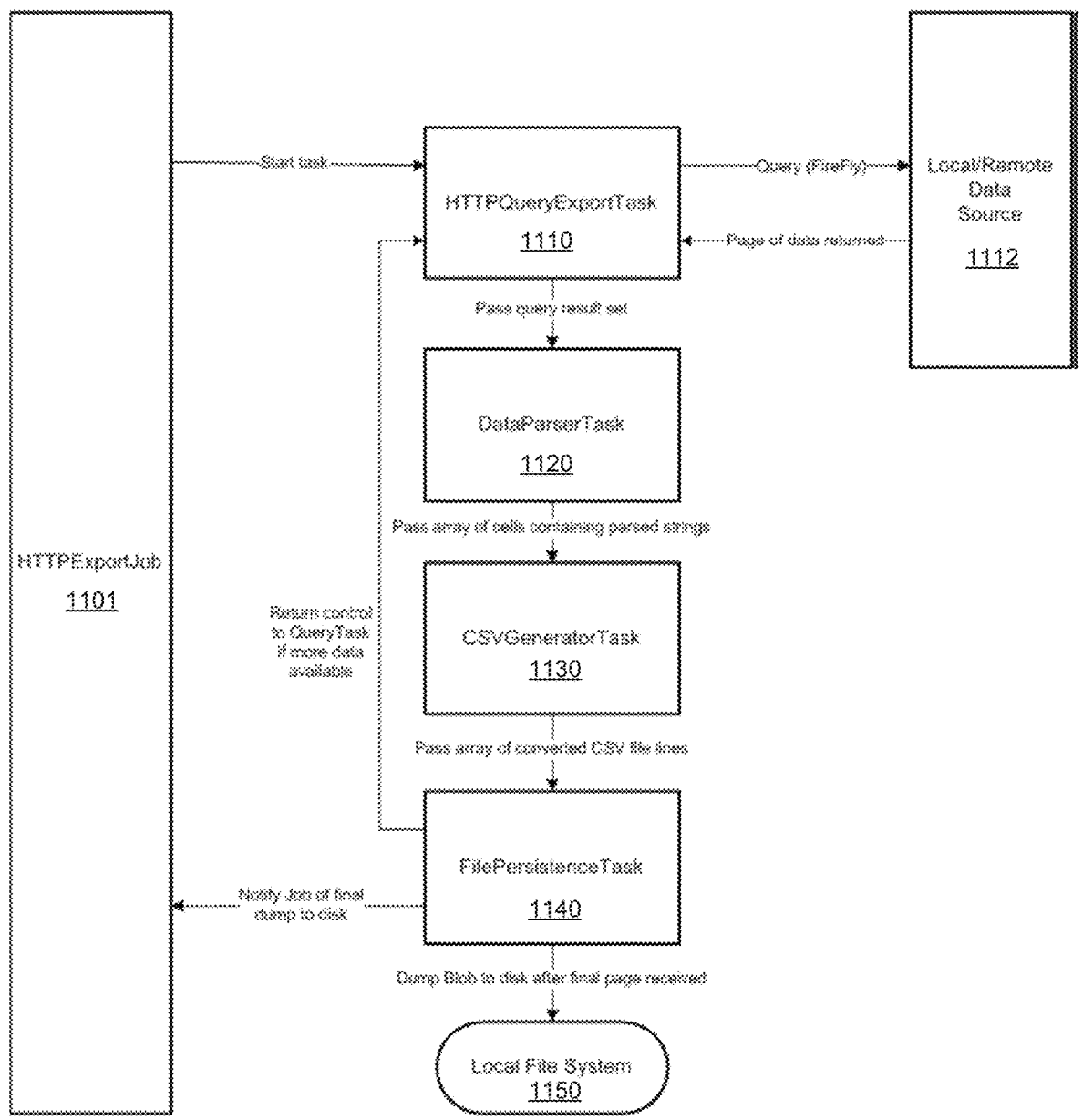
FIG. 11 is an example implementation of a job according to an embodiment.

FIG. 11 is an example implementation of a job according to an embodiment. In some embodiments, different jobs may have different tasks, and different job structures may be specified using different job request types. The present example in FIG. 11 shows an HTTPExportJob 1101. HTTPExportJob 1101 may generate a data retrieval task comprising a HTTPQueryExportTask 1110, a data parser task 1120, a CSV Generator Task 1130 (e.g., for format conversion), and a file persistence task 1140. If the job is a streaming job, tasks 1110 and 1120 may be combined and implemented, for example, using transfer control protocol (TCP) to connect to a Java service on the server side.

HTTPQueryExportTask 1110 may instantiate a query manager using a JSON query model to establish an interface to one or more backend systems to send remote data requests, initiate backend queries, and retrieve data. HTTPQueryExportTask 1110 may configure a page size using the dynamic paging technique illustrated above in connection with FIG. 9, for example. As pages of data are returned, the results are passed from an output of HTTPQueryExportTask 1110 to an input of data parser task 1120. Data parser task 1120 may parse the results set from HTTPQueryExportTask 1110, where the data may be stored in complex non-flat data structures such as tables with hierarchies, for example. Data parser task 1120 may parse such data structures and extract raw data values to produce arrays of data. For instance, in one embodiment, data parser task 1120 may receive a data structure comprising one or more tables from HTTPQueryExportTask 1110, and the data parser task may parse the table, identify data values in the table and possibly metadata, access formatting information for the data values (e.g., dollars, yen, or euros), and generate one or more arrays of formatted data, such as parsed strings, for example.

In this example, a data conversion task comprises a CSVGeneratorTask ("CSV") 1130. CSV 1130 may receive data as parsed strings and convert the data to an array of comma separated values, for example. Advantageously, the format of the exported data may be modified easily by replacing CSV 1130 with any other format conversion task, such as Excel, PDF, or the like, for example. Finally, CSV data is coupled to FilePersistenceTask 1140, which converts the CSV data to binary and stores the data in a local file system memory 1150. Control may then be passed back to HTTPQueryExportTask 1110 to retrieve the next page of data for processing, for example. When the final page is received, HTTPExportJob 1101 is notified and the job is completed. Advantageously, the data persistence step may be modified easily be simply replacing task 1140 with any other data persistence task, such as a more efficient persistence algorithm or a persistence algorithm tailored to operate on different operating systems, for example. As mentioned above, data results returned to the HTTPQueryExportTask may be large and complex. One advantage to parsing and converting to CSV is to reduce the amount of, and complexity of, the results for easy local storage and transport.

Hardware

Figure 12:
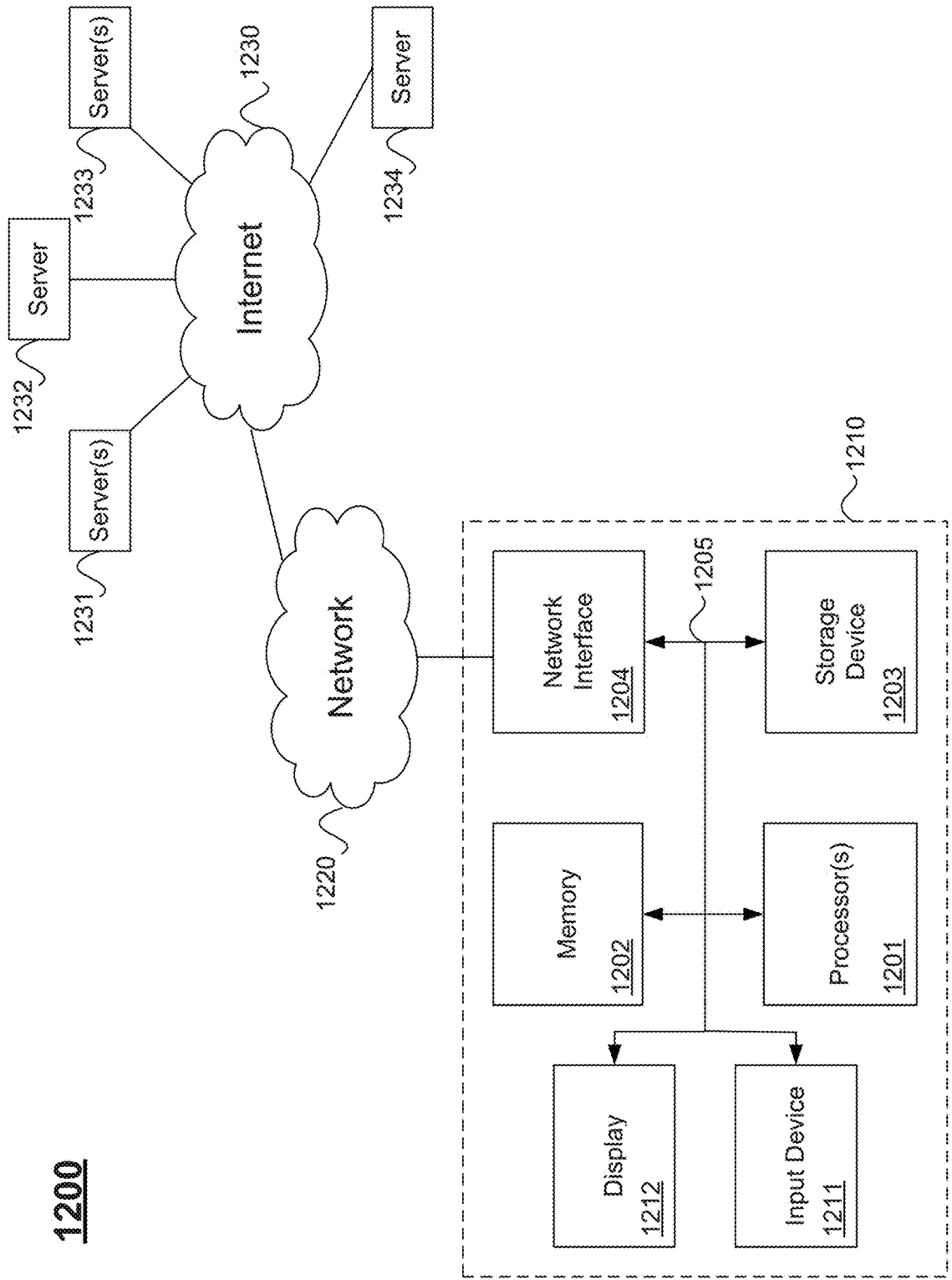
FIG. 12 illustrates hardware of a special purpose computing machine configured according to the above disclosure.

FIG. 12 illustrates hardware of a special purpose computing machine configured according to the above disclosure. The following hardware description is merely one example. It is to be understood that a variety of computers topologies may be used to implement the above described techniques. An example computer system 1210 is illustrated in FIG. 12. Computer system 1210 includes a bus 1205 or other communication mechanism for communicating information, and one or more processor(s) 1201 coupled with bus 1205 for processing information. Computer system 1210 also includes a memory 1202 coupled to bus 1205 for storing information and instructions to be executed by processor 1201, including information and instructions for performing some of the techniques described above, for example. This memory may also be used for storing programs executed by processor(s) 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1203 may include source code, binary code, or software files for performing the techniques above, for example. Storage device and memory are both examples of non-transitory computer readable storage mediums.

Computer system 1210 may be coupled via bus 1205 to a display 1212 for displaying information to a computer user. An input device 1211 such as a keyboard, touchscreen, and/or mouse is coupled to bus 1205 for communicating information and command selections from the user to processor 1201. The combination of these components allows the user to communicate with the system. In some systems, bus 1205 represents multiple specialized buses, for example.

Computer system 1210 also includes a network interface 1204 coupled with bus 1205. Network interface 1204 may provide two-way data communication between computer system 1210 and a network 1220. The network interface 1204 may be a wireless or wired connection, for example. Computer system 1210 can send and receive information through the network interface 1204 across a local area network, an Intranet, a cellular network, or the Internet, for example. In the Internet example, a browser, for example, may access data and features on backend systems that may reside on multiple different hardware servers 1231-1234 across the network. Hardware servers 1231-1234 and The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

APPENDIX A

```
Example query model:
{
    "DataSource": {
        "ObjectName": "/t.TEST/ACT_FLAT_income_qs",
        "SchemaName": "TENANT_TEST",
        "System": "EHS",
        "Type": "Planning"
    },
    "Dimensions": [
        {
            "AttributeSettings": [
                {
                    "Name": "t.TEST:ACCOUNT_AUTO_2572",
                    "ResultSetFields": [
                        "t.TEST:ACCOUNT_AUTO_2572.ID",
                        "t.TEST:ACCOUNT_AUTO_2572.Description"
                    ]
                },
                {
                    "Name": "t.TEST:ACCOUNT_AUTO_2572.accType",
                    "ResultSetFields": [
                        "t.TEST:ACCOUNT_AUTO_2572.accType"
                    ]
                },
                {
                    "Name": "[t.TEST:ACCOUNT_AUTO_2572].path",
                    "ResultSetFields": [
                        "[t.TEST: ACCOUNT_AUTO_2572].path"
                    ]
                }
            ],
            "Axis": "Columns",
            "CType": "Members",
            "FieldLayoutType": "FieldBased",
            "FieldSettings": [
                {
                    "CType": "Field",
                    "Name": "t.TEST:ACCOUNT_AUTO_2572.ID"
                },
                {
                    "CType": "Field",
                    "Name": "t.TEST:ACCOUNT_AUTO_2572.accType"
                },
                {
                    "CType": "Field",
                    "Name": "t.TEST:ACCOUNT_AUTO_2572.Description"
                },
                {
                    "CType": "Field",
                    "Name": "[t.TEST:ACCOUNT_AUTO_2572].key"
                },
                {
                    "CType": "Field",
                    "Name": "[t.TEST:ACCOUNT_AUTO_2572].description"
                },
                {
                    "CType": "Field",
                    "Name": "[t.TEST:ACCOUNT_AUTO_2572].name"
                },
                {
                    "CType": "Field",
                    "Name": "[t.TEST:ACCOUNT_AUTO_2572].path"
```

APPENDIX A-continued

```
            }
        ],
        "Hierarchy": {
            "ExpandBottomUp": false,
            "HierarchyActive": true,
            "HierarchyName": "parentId",
            "InitialDrillLevel": 0,
            "LowerLevelNodeAlignment": "Default",
            "MemberOfPostedNodeVisibility": "Visible",
            "Name": "parentId",
            "NodeCondensation": false
        },
        "MembersRepo": [ ],
        "Name": "t.TEST:ACCOUNT_AUTO_2572",
        "NonEmpty": false,
        "ReadMode": "BookedAndSpaceAndState",
        "ResultSetAttributeNodes": [ ],
        "ResultSetFields": [ ],
        "ResultStructureRepo": {
            "CType": "Totals",
            "ResultAlignment": "Bottom",
            "Visibility": "Hidden",
            "VisibilitySettings": [
                {
                    "Result": "Total",
                    "ResultAlignment": "Top",
                    "Visibility": "Hidden"
                },
                {
                    "Result": "TotalIncludedMembers",
                    "ResultAlignment": "Top",
                    "Visibility": "Hidden"
                },
                {
                    "Result": "TotalRemainingMembers",
                    "ResultAlignment": "Top",
                    "Visibility": "Hidden"
                },
                {
                    "Result": "Total",
                    "ResultAlignment": "Bottom",
                    "Visibility": "Hidden"
                },
                {
                    "Result": "TotalIncludedMembers",
                    "ResultAlignment": "Bottom",
                    "Visibility": "Hidden"
                },
                {
                    "Result": "TotalRemainingMembers",
                    "ResultAlignment": "Bottom",
                    "Visibility": "Hidden"
                },
                {
                    "Result": "Members",
                    "ResultAlignment": "Top",
                    "Visibility": "Visible"
                },
                {
                    "Result": "Members",
                    "ResultAlignment": "Bottom",
                    "Visibility": "Visible"
                }
            ]
        }
    },
],
"Query": {
    "Axes": [
        {
            "Axis": "Columns",
            "CType": "Axis",
            "Layout": [
                "t.TEST:ACCOUNT_AUTO_2572"
            ],
            "ResultStructureRepo": {
                "CType": "Totals",
                "ResultAlignment": "Default",
                "Visibility": "Default"
            },
```

APPENDIX A-continued

```
            "Type": 2,
            "ZeroSuppressionType": 0
        },
        {
            "Axis": "Rows",
            "CType": "Axis",
            "Layout": [ ],
            "ResultStructureRepo": {
                "CType": "Totals",
                "ResultAlignment": "Default",
                "Visibility": "Default"
            },
            "Type": 1,
            "ZeroSuppressionType": 0
        }
    ],
    "AxesLayout": [
        {
            "Axis": "Free",
            "OrderedDimensionNames": [
                "t.TEST:Continent__2572",
                "t.TEST:Country__2572",
                "t.TEST:City__2572",
                "t.TEST:Gender__2572",
                "t.TEST:Date__2572",
                "t.TEST:Export__Rate__2572",
                "t.TEST:Color__2572",
                "t.TEST:VERSION__2572__V",
                "__Package__",
                "$$Currency$$",
                "t.TEST:ACCOUNT__AUTO__2572.ID",
                "t.TEST:Continent__2572.ID",
                "t.TEST:Country__2572.ID",
                "t.TEST:City__2572.ID",
                "t.TEST:Gender__2572.ID",
                "t.TEST:Date__2572.DATE",
                "t.TEST:Date__2572.DATE2",
                "t.TEST:Export__Rate__2572.ID",
                "t.TEST:Color__2572.ID",
                "t.TEST:VERSION__2572__V.ID",
                "t.TEST:ACCOUNT__AUTO__2572.accType",
                "t.TEST:ACCOUNT__AUTO__2572.Description",
                "t.TEST:Continent__2572.Description",
                "t.TEST:Country__2572.Description",
                "t.TEST:City__2572.Description",
                "t.TEST:Gender__2572.Description",
                "t.TEST:Date__2572.YEAR",
                "t.TEST:Date__2572.CALQUARTER",
                "t.TEST:Date__2572.CALMONTH",
                "t.TEST:Date__2572.CALWEEK",
                "t.TEST:Date__2572.HALFYEARDESC",
                "t.TEST:Date__2572.QUARTERDESC",
                "t.TEST:Date__2572.MONTHDESC",
                "t.TEST:Date__2572.WEEK",
                "t.TEST:Date__2572.DAY",
                "t.TEST:Date__2572.MONTHDAYDESC",
                "t.TEST:Date__2572.DAYNAME",
                "t.TEST:Export__Rate__2572.Description",
                "t.TEST:Color__2572.Description",
                "t.TEST:VERSION__2572__V.VERSION",
                "t.TEST:VERSION__2572__V.USER",
                "t.TEST:VERSION__2572__V.TYPE",
                "t.TEST:VERSION__2572__V.SOURCE__VERSION",
                "t.TEST:VERSION__2572__V.CATEGORY",
                "__Model__",
                "__TechVersionType__",
                "$$Version$$",
                "CustomDimension1"
            ]
        },
        {
            "Axis": "Columns",
            "OrderedDimensionNames": [
                "t.TEST:ACCOUNT__AUTO__2572"
            ]
        }
    ]
},
"ResultSetPersistanceSchema": null,
"ResultSetPersistanceTable": null,
```

APPENDIX A-continued

```
    "ResultStructureRepo": {
        "CType": "Totals",
        "ResultAlignment": "Default",
        "Visibility": "Default"
    },
    "SortRepo": {
        "CType": "Sorting",
        "Elements": [ ]
    }
}
```

What is claimed is:

1. A method comprising:

creating, by a first widget on a web browser running on a first computer system, a first data visualization on a first web page using first data stored remotely on one or more second computer systems, wherein the first data visualization is of a first visualization type of a plurality of visualization types, the first widget is optimized for the first visualization type, and the plurality of visualization types include at least one of table, chart, and geospatial data types;

receiving a first input from a user to download a copy of the first data from the second computer systems;

generating, by the first widget, a first data retrieval task, a first data conversion task, and a first data persistence task;

receiving, by the first data retrieval task, a query model that represents a remote query on remote data to retrieve the first data, and in accordance therewith, generating a data request specifying one or more queries on the second computer systems;

converting, by the first data conversion task, arrays of the first data received from the data retrieval task in a first format to a second format;

converting, by the first data persistence task, the first data in the second format to a binary format;

storing the first data in the binary format in memory on the first computer system;

recreating, by the first widget, the first data visualization using the stored first data;

creating, by a second widget on the web browser running on the first computer system, a second data visualization on a second web page using second data stored remotely on the second computer systems, wherein the second data visualization is of a second visualization type of the plurality of visualization types and the second widget is optimized for the second visualization type; and generating, by the second widget, a second data retrieval task, a second data conversion task, and a second data persistence task responsive to a second user input to store a copy of the second data on the first computer system.

2. The method of claim 1 wherein the receiving the query model and generating the data request further comprises generating a query manager object based on the query model to communicate with the one or more second computer systems, wherein the query manager object generated based on the query model corresponds to a state of another query manager object at a time the request to export data was received.

3. The method of claim 1 wherein the first data retrieval task comprises a query export task that communicates with the second computer systems using a hypertext transfer protocol (HTTP) and data is received by the query export task one page at a time.

4. The method of claim 3 wherein the first data retrieval task further comprises a data parser task coupled to an output of the query export task, wherein the data parser task receives a data structure comprising one or more tables from the query export task, wherein the method further comprises, by the data parser task:

parsing the table;

identifying data values in the table;

accessing formatting information for the data values; and generating one or more arrays of formatted data.

5. The method of claim 1 wherein the first data retrieval task comprises a data streaming task having an output coupled to the data conversion task, the data streaming task communicating with the second computer systems using a transmission control protocol (TCP) to produce arrays of formatted data as a stream of packets from one or more servers in response to sending the data request.

6. The method of claim 1 wherein the data request comprises a data set identification, a query model, and one or more data filters, wherein the data set identification identifies one or more remote data sets in the remote data, the query model represents a remote query on the remote data, and the data filters are particular filters used to produce the data to be exported.

7. The method of claim 6 wherein the first data retrieval task receives the data set identification, the query model, and the data filters to initiate one or more remote queries.

8. A system comprising:

a processor; and a memory coupled to the processor, the memory storing instructions executable by the processor to perform a method, the method comprising:

creating, by a first widget on a web browser running on a first computer system, a first data visualization on a first web page using first data stored remotely on one or more second computer systems, wherein the first data visualization is of a first visualization type of a plurality of visualization types, the first widget is optimized for the first visualization type, and the plurality of visualization types include at least one of table, chart, and geospatial data types;

receiving a first input from a user to download a copy of the first data from the second computer systems;

generating, by the first widget, a first data retrieval task, a first data conversion task, and a first data persistence task;

receiving, by the first data retrieval task, a query model that represents a remote query on remote data to retrieve the first data, and in accordance therewith, generating a data request specifying one or more queries on the second computer systems;
converting, by the first data conversion task, arrays of the first data received from the data retrieval task in a first format to a second format;
converting, by the first data persistence task, the first data in the second format to a binary format;
storing the first data in the binary format in memory on the first computer system;
recreating, by the first widget, the first data visualization using the retrieved stored first data;
creating, by a second widget on the web browser running on the first computer system, a second data visualization on a second web page using second data stored remotely on the second computer systems, wherein the second data visualization is of a second visualization type of the plurality of visualization types and the second widget is optimized for the second visualization type; and
generating, by the second widget, a second data retrieval task, a second data conversion task, and a second data persistence task responsive to a second user input to store a copy of the second data on the first computer system.

9. The method of claim 8 further comprising repeating said initiating the first query, receiving the at least one single row of data, determining the number of cells per row, and initiating the second query to retrieve different data from different data sets.

10. The method of claim 8 wherein the second computer systems comprise a cloud computer system.

11. The method of claim 8 wherein the second computer systems comprise an on-prem computer system.

12. The method of claim 8 wherein the first data is visualization data.

13. A non-transitory machine-readable medium storing a program executable by at least one processing unit of a device, the program comprising sets of instructions for:
creating, by a first widget on a web browser running on a first computer system, a first data visualization on a first web page using first data stored remotely on one or more second computer systems, wherein the first data visualization is of a first visualization type of a plurality of visualization types, the first widget is optimized for the first visualization type, and the plurality of visualization types include at least one of table, chart, and geospatial data types;
receiving a first input from a user to download a copy of the first data from the second computer systems;
generating, by the first widget, a first data retrieval task, a first data conversion task, and a first data persistence task;
receiving, by the first data retrieval task, a query model that represents a remote query on remote data to retrieve the first data, and in accordance therewith, generating a data request specifying one or more queries on the second computer systems;
converting, by the first data conversion task, arrays of the first data received from the data retrieval task in a first format to a second format;
converting, by the first data persistence task, the first data in the second format to a binary format;
storing the first data in the binary format in memory on the first computer system;
recreating, by the first widget, the first data visualization using the stored first data;
creating, by a second widget on the web browser running on the first computer system, a second data visualization on a second web page using second data stored remotely on the second computer systems, wherein the second data visualization is of a second visualization type of the plurality of visualization types and the second widget is optimized for the second visualization type; and
generating, by the second widget, a second data retrieval task, a second data conversion task, and a second data persistence task responsive to a second user input to store a copy of the second data on the first computer system.

14. The non-transitory machine-readable medium of claim 13 wherein the receiving the query model and generating the data request further comprise generating a query manager object based on the query model to communicate with the one or more second computer systems, wherein the query manager object generated based on the query model corresponds to a state of another query manager object at a time the request to export data was received.

15. The non-transitory machine-readable medium of claim 13 wherein the first data retrieval task comprises a query export task that communicates with the second computer systems using a hypertext transfer protocol (HTTP) and data is received by the query export task one page at a time.

16. The non-transitory machine-readable medium of claim 15 wherein the first data retrieval task further comprises a data parser task coupled to an output of the query export task, wherein the data parser task receives a data structure comprising one or more tables from the query export task, wherein the method further comprises, by the data parser task:
parsing the table;
identifying data values in the table;
accessing formatting information for the data values; and
generating one or more arrays of formatted data.

17. The non-transitory machine-readable medium of claim 13 wherein the data request comprises a data set identification, a query model, and one or more data filters, wherein
the data set identification identifies one or more remote data sets in the remote data,
the query model represents a remote query on the remote data, and
the data filters are particular filters used to produce the data to be exported.

18. The non-transitory machine-readable medium of claim 17 wherein the first data retrieval task receives the data set identification, the query model, and the data filters to initiate one or more remote queries.

* * * * *